United States Patent [19]

Kubota et al.

[11] Patent Number: 4,690,535

[45] Date of Patent: Sep. 1, 1987

[54] AUTOMATIC FILM PROCESSOR ARRANGEMENT

[75] Inventors: Takao Kubota; Yasuo Ujii, both of Saitama, Japan

[73] Assignee: Sun Seiki Co., Ltd., Japan

[21] Appl. No.: 881,977

[22] Filed: Jun. 27, 1986

[30] Foreign Application Priority Data

Jul. 3, 1985 [JP] Japan ................................ 60-101533

[51] Int. Cl.⁴ ................................................ G03B 3/08

[52] U.S. Cl. .................................... 354/322; 226/194; 384/295; 384/418; 384/439

[58] Field of Search ............... 354/319, 320, 321, 322; 226/188, 189, 190, 194; 384/295, 418, 419, 428, 439

[56] References Cited

U.S. PATENT DOCUMENTS

| | | | |
|---|---|---|---|
| 3,807,616 | 4/1974 | Hope et al. | 226/194 |
| 3,954,311 | 5/1976 | Pike | 384/439 |
| 4,076,341 | 2/1978 | Scheurecker et al. | 384/419 |
| 4,086,607 | 4/1978 | Muller | 354/322 |
| 4,327,989 | 5/1982 | Hope et al. | 354/322 |
| 4,358,194 | 9/1982 | Krehbiel | 226/190 |
| 4,420,241 | 12/1983 | Kastl et al. | 226/194 |
| 4,624,585 | 11/1986 | Nix | 384/295 |
| 4,637,741 | 1/1987 | Peugeot et al. | 384/439 |

FOREIGN PATENT DOCUMENTS 2425190 12/1974 Fed. Rep. of Germany .

*Primary Examiner*—A. A. Mathews
*Attorney, Agent, or Firm*—Lowe, Price, Leblanc, Becker & Shur

[57] ABSTRACT

An automatic film processor arrangement is provided, which comprises a plurality of processing tanks each being charged with a processing liquid, and plural sets of a pair of rollers mounted within the respective processing tanks to continuously pass a photosensitive film through the processing liquids. Shafts projecting from both ends of the rollers are provided with sleeve-like bearings. Each bearing is formed on the inner face with a projection in the circumferential direction, is formed with a split groove extending axially from a mouth thereof which is open on the roller side, and includes opposing flat portions on the outer face. The bearing is locked in place by engaging its projection within the groove formed in the shaft of each roller. Each pair of roller are held by supporting the adjacent bearings by the lock plate on the same side. The lock plate includes an elongate slot having a width equal to the distance between the flat portions of the bearing, said slot being adapted to receive said flat portions to allow a pair of rollers to come into contact with each other along the full length thereof.

4 Claims, 6 Drawing Figures

AUTOMATIC FILM PROCESSOR ARRANGEMENT

BACKGROUND OF THE INVENTION

1. Field of the Invention

The present invention relates to an automatic film processor arrangement and, more particularly, to an automatic film processor arrangement which includes a plurality of processing tanks, each being charged with a processing liquid, and plural pairs of rollers respectively mounted within said plurality of processing tanks for continuously passing a photosensitive film through the processing liquid.

2. Statement of the Related Art

An arrangement of the type as mentioned just above is disclosed in West German Pat. No. 2,425,190 specification, for instance. The arrangement includes two sets of a pair of feed rollers in the associated processing tanks. A photosensitive film is then continuously fed through a processing liquid by the rotation of the rollers. The feed rollers are each fitted over its shaft with a bearing to be fitted into a groove formed vertically in a side wall of each processing tank, and are rotated through gears, which engage the associated worm gears provided on a horizontal driving shaft revolved by a motor.

When the aforesaid driving shaft is disposed below a pair of feed rollers, however, it is adapted to pass through the partitions in the processing liquid. This offers some problems in connection with liquid leakage, durability, etc. Since they are rotatably supported on bearings fixedly provided on the upper position of the said rollers, it is required to attach or detach the feed rollers to or from the processing tanks in a given inclined state to avoid the aforesaid driving shaft for the maintenance or replacement of said feed rollers, so that there is a drop in workability. There is also a possibility that, at the time of attachment or detachment, the bearings for the feed rollers located on the feed side may be inclined and disengage from the given position.

OBJECT AND SUMMARY OF THE INVENTION

An object of the present invention is to provide an automatic film processor arrangement in which a pair of feed rollers united to bearings are provided for attachment to or detachment from processing tanks.

Another object of the present invention is to provide an automatic film processor arrangement wherein, when a pair of feed rollers are attached to or detached from processing tanks, any disengagement of bearings from the roller shafts is avoided.

A further object of the present invention is to provide an automatic film processor arrangement, wherein a pair of feed rollers are allowed to come into pressure contact with each other along the full length thereof.

More specifically, the present invention provides an automatic film processor arrangement including a plurality of processing tanks, each being charged with a processing liquid, and plural pairs of rollers received therein to continuously pass a photosensitive film through the processing liquid, wherein:

each of said rollers includes a shaft projecting from both its ends, which is provided with a lock groove in the circumferential direction, a sleeve-like bearing is provided to rotatably support said shaft, said bearing being formed on the inner face with a projection to be locked in said lock groove, including a split groove which extends axially from the mouth thereof which is open on the roller side, and being formed on the outer face with flat portions, and a lock plate is provided to support said bearing, said lock plate including an elongated slot having a width equal to the distance between said flat portions of said bearing, and serving to receive the flat portions of said bearings for a pair of rollers, thereby supporting said pair of rollers while they come into contact with each other along the full length thereof.

In one preferred embodiment of the present invention, said bearing includes on the outer face a guide groove in which an endless elastic member is engaged to allow a pair of rollers supported on said lock plates to come into pressure contact with each other along the full length thereof.

In another embodiment of the present invention, said elongate slot formed in said lock plate is partly enlarged to receive said bearing.

In a further embodiment of the present invention, said elongate slot is cut out at the lower end thereof to make the insertion of the bearing thereinto easy.

DETAILED DESCRIPTION OF THE PREFERRED EMBODIMENTS

Figure 1:
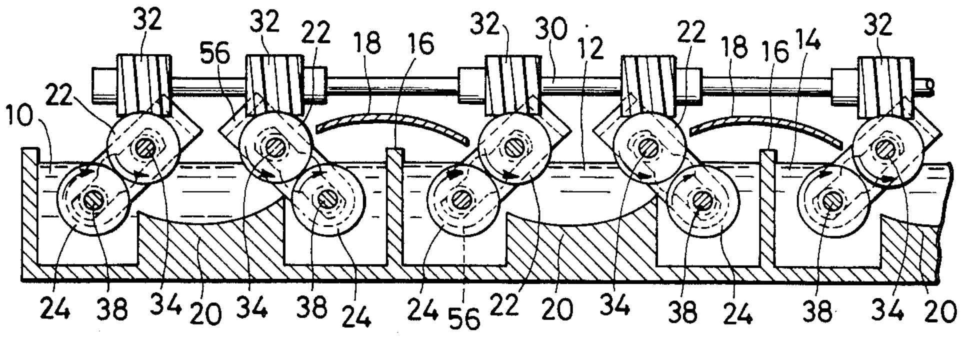
FIG. 1 is a partly sectioned front view showing the processing tanks in the automatic film processor arrangement according to the present invention.
Figure 2:
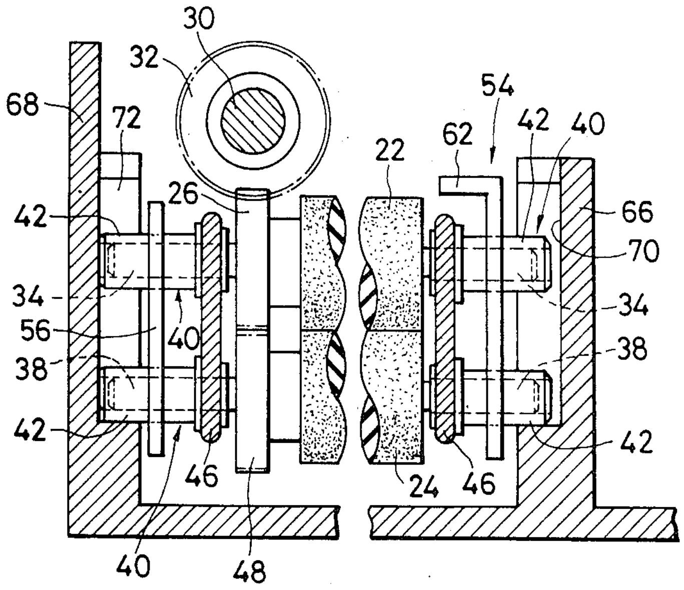
FIG. 2 is a sectioned side view showing the rollers, the intermediate part of which is omitted.
Figure 3:
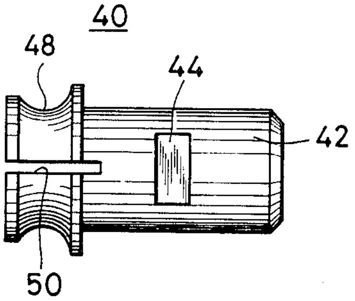
FIG. 3 is a front view showing the bearing.
Figure 4:
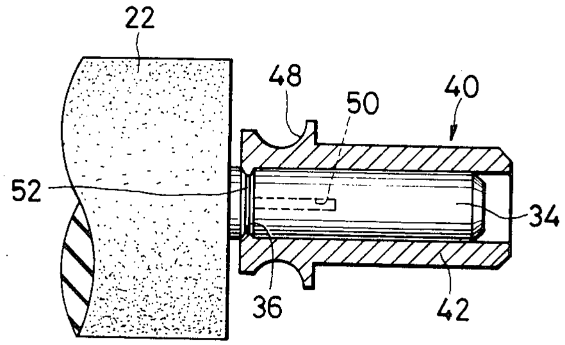
FIG. 4 is a partly sectioned view showing the bearings attached to the shafts of the roller.

Referring now to FIG. 1 illustrating the zone for development in the automatic film processor arrangement according to the present invention, a developing tank 10, a fixing tank 12 and a rinsing tank 14 are defined by partitions 16 and 16. Above the partitions 16 and 16 between the respective processing tanks 10, 12 and 14, there are guide plates 18 and 18 which are provided for guiding the delivery of a photosensitive film, and have downwardly curved surfaces. On the bottoms of the processing tanks 10, 12 and 14, there are guide means 20, 20 and 20 which have upwardly curved surfaces.

The processing tanks 10, 12 and 14 are each provided therein with two sets of a pair of feed rollers 22 and 24, which are fixedly provided at one ends with mating gears 26 and 28. The gear 26 of the feed roller 22 mates successively with worm gears 32, 32, . . . . . . on a horizontally positioned driving shaft 30 driven by a motor (not illustrated), so that both feed rollers 22 and 24 are rotated by the revolution of the driving shaft to advance the photosensitive film in the processing direction.

A shaft 34 projecting from both ends of the feed roller 22 is provided with a lock groove 36 in the circumferential direction. A shaft 38 projecting from both ends of the feed roller 24 is also provided with a similar groove 36 in the circumferential direction. Both ends of the shafts 34 and 38 of both feed rollers 22 and 24 are rotatably supported by associated bearings 40. Each bearing 40 includes a sleeve-like body 42 having on the outer surface a pair of opposing flat portions 44 and 44 and a guide groove 48 for an endless elastic member 46 such as, for example, a loop spring. The bearing 40 is also provided with a pair of split grooves 50 which extend axially from its mouth which is open on the roller side, and with a projection 52 to engage within the lock groove 36 on the inner face of that mouth.

Figure 5:
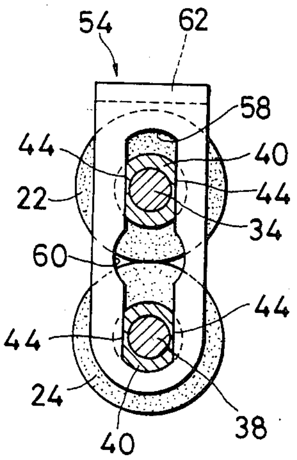
FIG. 5 is a sectional view showing a pair of feed rollers supported on the lock plate.
Figure 6:
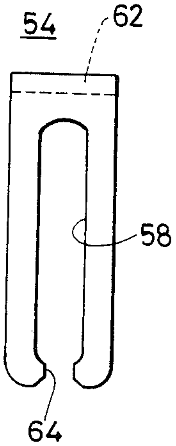
FIG. 6 is a front view showing another embodiment of the lock plate.

A pair of feed rollers 22 and 24 having the bearings 40 mounted at both ends of the shafts 34 and 38 are supported in place by clamping the adjacent bearings 40 between lock plates 54 and 56. As illustrated in FIG. 5, each lock plate 54 includes a longitudinally elongated slot 58 having a width equal to the distance between the flat portions 44 and 44 on the bearing 40, said slot having an intermediate transition portion 60 of a larger diameter, through which the bearings 40 are insertable. The pair of feed rollers 22 and 24 are fixedly located at the upper and lower positions respectively, by inserting their bearings 40 through that enlarged transition portion 60 and engaging the flat portions thereof with the sides of the slot 58. The lock plate 54 is provided at the upper end with a knob piece 62 for the purpose of attachment or detachment, which is obtained by bending. It is to be noted that, as illustrated in FIG. 6, the lock plate 54 may be cut out at the lower end to define a groove 64 which is contiguous to the lower end of the longitudinally elongated slot 58 and has a width norrower than that of the slot 58. Where the bearings 40 are supported with such a lock plate, they may be forced in place from the cut-out groove 64.

The other lock plate 56 includes an elongated slot and an enlarged portion or a cut-out groove similar to those in the lock plate 54 as shown in FIG. 5 or 6, but is not provided at the upper end with any knob piece.

One lock plate 56 serves to support the bearings 40 and 40 attached to the shafts 34 and 38 located on one side on which the driving shaft 30 is found, while the other lock plate 54 serves to support the bearings 40 and 40 attached to the shafts 34 and 38 located on the other or opposite side on which the driving shaft 30 is not found, thereby allowing both feed rollers 22 and 24 to come into contact with each other along their full length. Furthermore, both feed rollers 22 and 24 are allowed to come into pressure contact with each other along their full length by winding the endless elastic member 45 around the guide grooves 48 and 48 in the adjacent bearings 40 and 40 of the aforesaid shafts 34 and 38.

Thus, the pair of feed rollers 22 and 24 supported and united together by the lock plate 54 and 56 have their bearings 40 fitted into bearing-supporting grooves 70 and 72 which are formed at an angle on both side walls 66 and 68 of each of the processing tanks 10, 12 and 14.

Therefore, since the flat portions 44 of each bearing 40 are engaged with the sides of the slot 58 of each of the lock plates 54 and 56 and the projection 52 of each bearing 40 is fitted into the groove 36 of each of the shafts 34 and 38, there is no possibility that disengagement of the parts united together may take place, even when the lock plate 54 may be inclined by handling of the knob piece 62, and detached from the respective tanks 10, 12 and 14.

We claim:

1. An automatic film processor arrangement including a plurality of processing tanks, each being charged with a processing liquid and plural pairs of rollers received therein to continuously pass a photosensitive film through the processing liquid, wherein:
   - each of said rollers includes a shaft projecting from its both ends, which is provided with a lock groove in the circumferential direction,
   - a sleeve-like bearing is provided to rotatably support said shaft, said bearing being formed on the inner face with a projection to be locked in said lock groove, including a split groove which extends axially from the mouth thereof which is open on the roller side, and being formed on the outer face with flat portions, and
   - a lock plate is provided to supprt said bearing, said lock plate including an elogated slot having a width equal to the distance between said flat portions of said bearing, and serving to receive the flat portions of said bearings for a pair of rollers, thereby supporting said pair of rollers while they come into contact with each other along the full length thereof.

2. The film processor arrangement as claimed in claim 1, wherein said bearing includes on the outer face a guide groove in which an endless elastic member is engaged to allow a pair of rollers supported on said lock plates to come into pressure contact with each other along the full length thereof.

3. The film processor arrangement as claimed in claim 1, wherein said elongate slot formed in said lock plate is partly enlarged to receive said bearing.

4. The film processor arrangement as claimed in claim 1, wherein said elongate slot is cut out at the lower end thereof.

* * * * *